United States Patent [19]
Gagliardi, Jr.

[11] Patent Number: 5,976,585
[45] Date of Patent: Nov. 2, 1999

[54] METHOD OF MAKING HOT DOG BASED FOOD PRODUCT AND FOOD PRODUCT THEREOF

[75] Inventor: Eugene D. Gagliardi, Jr., Atglen, Pa.

[73] Assignee: Visionary Design, Inc., Atglen, Pa.

[21] Appl. No.: 09/153,107

[22] Filed: Sep. 15, 1998

Related U.S. Application Data

[60] Provisional application No. 60/058,896, Sep. 15, 1997.

[51] Int. Cl.⁶ .................................................... A23L 1/317
[52] U.S. Cl. .............................. 426/76; 426/92; 426/104; 426/105; 426/293; 426/296; 426/302; 426/438; 426/518; 426/641
[58] Field of Search ................................ 426/76, 92, 104, 426/105, 293, 296, 302, 438, 518, 641, 646, 637

[56] References Cited

U.S. PATENT DOCUMENTS

| | | |
|---|---|---|
| 3,681,688 | 8/1972 | Stapley et al. ............................ 426/302 |
| 5,059,435 | 10/1991 | Sloan et al. .......................... 426/438 X |
| 5,069,914 | 12/1991 | Gagliardi ............................. 426/104 X |
| 5,415,881 | 5/1995 | Gagliardi ............................. 426/104 X |

FOREIGN PATENT DOCUMENTS

| | | | |
|---|---|---|---|
| 979715 | 12/1975 | Canada | ..................................... 426/92 |
| 1918996 | 10/1970 | Germany | ................................. 426/92 |

OTHER PUBLICATIONS

Rosen et al, *How to Garnish*, pp. 20, 59, 68, 96; 1983.

*Primary Examiner*—Arthur L. Corbin
*Attorney, Agent, or Firm*—Akin, Gump, Strauss, Hauer & Feld, L.L.P.

[57] ABSTRACT

A food product is provided and includes a hot dog having a generally elongate shape with a cylindrical midsection and first and second generally curved ends; and a plurality of cuts extending longitudinally through the entire width of the hot dog from a first end to a location proximate the second end to establish a plurality of segments and an uncut end portion to which the segments are attached; wherein at least a portion of the segments are covered by batter. Individual segments extracted from a hot dog that are covered with a batter are also provided. Methods to prepare the food products are also provided.

22 Claims, 2 Drawing Sheets

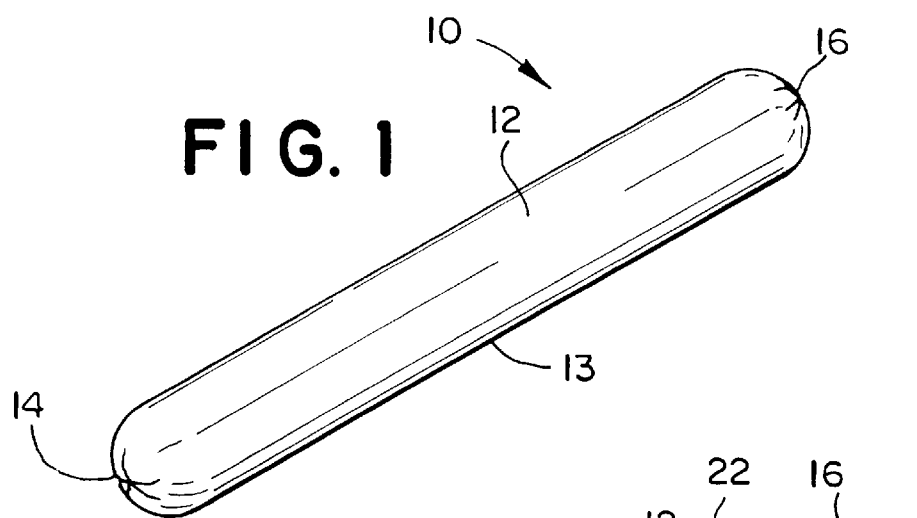
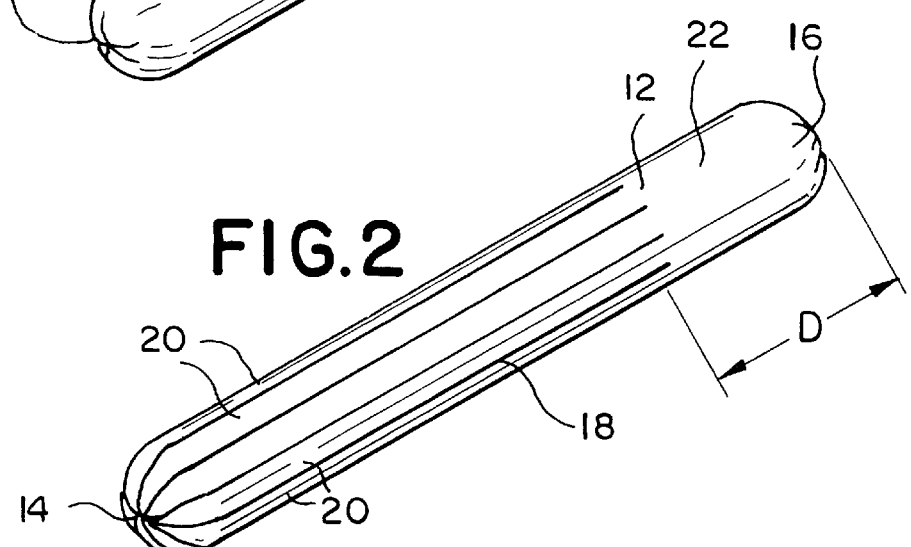
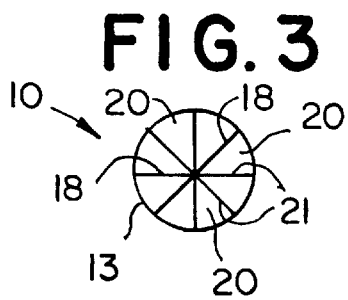
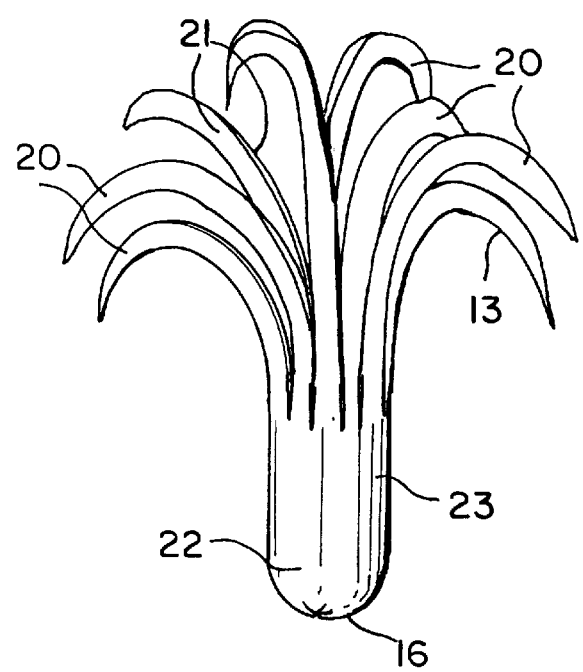

5,976,585

METHOD OF MAKING HOT DOG BASED FOOD PRODUCT AND FOOD PRODUCT THEREOF

CROSS REFERENCE TO RELATED APPLICATIONS

This application claims priority from Provisional Application No. 60/058,896, filed on Sep. 15, 1997.

BACKGROUND OF THE INVENTION

The present invention relates generally to a food product and method of making the food product and, more particularly, to a method of making a "fun food" product from a hot dog, and the food product resulting therefrom.

The traditional hot dog is one of the most popular foods available today and millions are sold on a daily basis both in restaurants and in retail and wholesale outlets for consumption. There are, of course, literally hundreds of different kinds of hot dogs, including traditional meat frankfurters, all beef hot dogs, chicken dogs, turkey dogs, etc. There are also numerous other types of hot dog-like food products including sausages, knockwurst, bratwurst, foot long hot dogs, veggie dogs, etc. The present invention is equally applicable with respect to all such generally cylindrical food products, all of which will hereinafter be generally referred to as "hot dogs" for the sake of brevity in describing the present invention.

Another food product which is currently experiencing great popularity is referred to as a "corn dog". A corn dog is essentially a hot dog, usually on a stick, which is dipped into or otherwise coated with a relatively thick coating of an unbaked corn meal batter on the outer surfaces of the hot dog and, thereafter, is deep fat fried. The corn meal batter is cooked in the deep fat to form a generally crunchy outer coating and a softer, corn bread like inner covering of the hot dog in a manner similar to that of a hush puppy.

The present invention takes advantage of the great popularity of both the hot dog and the corn dog to provide a fun food product which is expected to also become very popular.

BRIEF SUMMARY OF THE INVENTION

In a first aspect, the present invention comprises a food product including a hot dog having a generally elongate shape with a cylindrical midsection and first and second generally curved ends, the hot dog having a plurality of cuts extending longitudinally through the midsection from a first end to a location proximate the second end to establish a plurality of segments and an uncut portion to which the segments are attached. At least a portion of the segments are covered by batter.

In a second aspect, the present invention includes a food product comprising at least one elongated segment having first and second ends, the segment being cut longitudinally from a hot dog having an elongate shape with first and second curved ends. At least a portion of the segment is covered with batter.

In a third aspect, a method of preparing a food product is provided. The method steps include slicing a hot dog having a generally elongate shape with a generally cylindrical mid section and first and second generally curved ends lengthwise from a first end to a location proximate the second end thereby forming a plurality of segments adjacent and connected to an uncut portion. At least a portion of the segments of the hot dog are immersed into a batter so as to cover the immersed portion in a layer of batter.

In a fourth aspect, a method of preparing a food product is provided, the steps of the method including slicing a hot dog having a generally elongate shape with a generally cylindrical mid section and first and second generally curved ends lengthwise from a first end to the second end to form a plurality of segments. At least a portion of each of the segments is immersed into a batter so as to cover the immersed portion in a layer of batter.

BRIEF DESCRIPTION OF THE SEVERAL VIEWS OF THE DRAWINGS

The following description of preferred embodiments of the present invention will be better understood when read in conjunction with the drawings. Although the drawings illustrate preferred embodiments of the invention, it should be understood that the invention is not limited to the illustrated embodiments. In the drawings:

FIG. 1 is a perspective view of a hot dog of a type which may be used in connection with the present invention;

FIG. 2 is a perspective view of the hot dog of FIG. 1 after being sliced lengthwise in accordance with a first embodiment of the present invention;

FIG. 3 is a left-end view of the sliced hot dog of FIG. 2;

FIG. 4 is a perspective view of a first preferred food product in accordance with the present invention;

DETAILED DESCRIPTION OF THE PREFERRED EMBODIMENTS OF THE INVENTION

Figure 5:
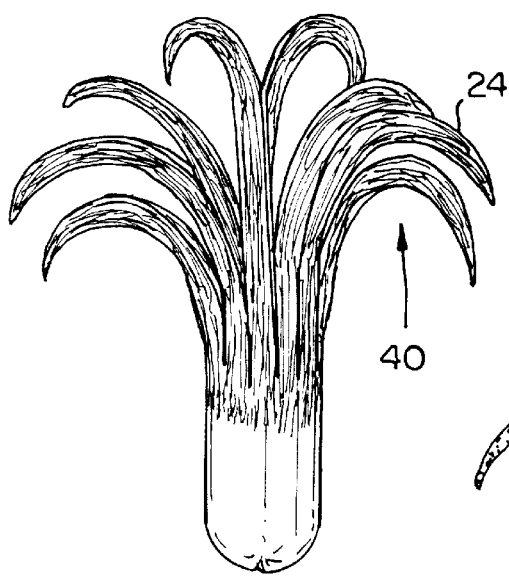
FIG. 5 is a perspective view of a first preferred food product covered in part with the batter coating in accordance with the present invention.

As discussed above, the present invention comprises a method of making a new food product from a hot dog. FIG. 1 illustrates a typical hot dog shown generally as 10. As also discussed above, for purposes of describing the present invention, the term "hot dog" is meant to include not only a standard meat, beef, chicken, turkey or other frankfurter, but also any other type of elongated meat or vegetable based food product, such as a sausage, knockwurst, bratwurst, "veggie dog" or any other similar or related product to which the below described method steps could be applied. The hot dog 10 could be of the "skinned" type but, preferably, is of the "skinless" type. As shown, the hot dog 10 includes a generally cylindrical midsection 12, first and second generally curved ends 14 and 16, and circumferential outer surface 13. The hot dog 10 may be made in any manner known to those of ordinary skill in the meat processing art.

A first embodiment of the present invention is illustrated in FIGS. 24. In the first step of the first embodiment, the hot dog 10 is sliced lengthwise or longitudinally through the hot dog 10 as illustrated in FIGS. 2 and 3 from the first end 14 to a predetermined distance "D" proximate the second end 16 to establish wedged segments 20 and an uncut portion 22. Referring to FIG. 3, four thin, elongated cuts 18 are made lengthwise along the cut portion of the hot dog 10 with each of the cuts 18 extending completely through the cross-section of hot dog 10 and each of the cuts 18 being generally equally circumferentially spaced from each other. Referring to FIG. 4, when four such equally spaced cuts 18 are employed, the cut portion of the hot dog 10 is separated into eight generally equal sized generally wedged shaped segments 20 each of which are generally shaped like pieces of a pie in cross section. It should be understood that while in the present embodiment, four cuts 18 are made for the purpose of creating eight generally equal segments 20, a greater or lesser number of cuts 18 could alternatively be made. For example, three generally equally spaced cuts could be made in the hot dog 10 thereby creating six generally equally sized shaped wedge segments. Alternatively, five generally equally spaced cuts could be made in the hot dog 10 thereby creating ten generally equally sized segments. If desired, the cuts could be unequally spaced creating segments of differing cross sectional sizes (not shown). It should therefore be clearly understood that the present invention is not limited to a particular number of cuts or a particular number of segments or to segments of a particular size or shape.

The cuts 18 may be made in the hot dog 10 manually using a knife, razor blade or any other relatively sharp thin bladed instrument to make the individual cuts 18. Alternatively, a cutting tool, such as that described in U.S. Pat. No. 5,771,771 to Gagliardi, Jr., may be employed for simultaneously making a plurality of the cuts 18 or all of the cuts 18 of hot dog 10. It should be understood that the particular manner in which the cuts 18 are made and the particular equipment or method used for making the cuts 18 should not be considered to be a limitation on the present invention, since the cuts 18 can be made in any manner using any type of equipment.

In the present embodiment and referring to FIG. 2, the pre-determined distance D of the uncut portion 22 of the hot dog 10 is approximately one to one and one-half inches. It will be appreciated by those of ordinary skill in the art that the length D of the uncut portion 22 of the hot dog 10 may vary depending upon the overall length of the hot dog 10, the overall diameter of the hot dog 10 and other factors. The only requirement is that the uncut portion 22 of the hot dog 10 be of sufficient size to support and hold together the ends of the cut segments 20 during subsequent processing as described below.

Referring to FIG. 4, each of the wedged segments 20 have inner surfaces 21 that are of a different texture (e.g. smoother and moister) than the circumferential outer surface 13. The circumferential outer surface 23 of the uncut portion 22 remains the same as it was prior to cutting. After cutting, preferably immediately after cutting to prevent drying out of the wedged segments 20, the hot dog 10 is immersed into a batter (not shown). Preferably the entire hot dog 10 is immersed or at least all of the segment wedges 20 are immersed so that the batter forms an exterior coating 24 on the inner surfaces 21 and circumferential outer surface 13 of the segment wedges 20 as shown in FIG. 5 by hatch marks or alternatively both the uncut segment 22 and segment wedges 20 are immersed so that an exterior coating of batter 24 is formed on the inner surfaces 21, circumferential outer surface 13 of the segment wedges and on the outer circumferential surface 23 of the uncut segment 22 (not shown).

Figure 6:
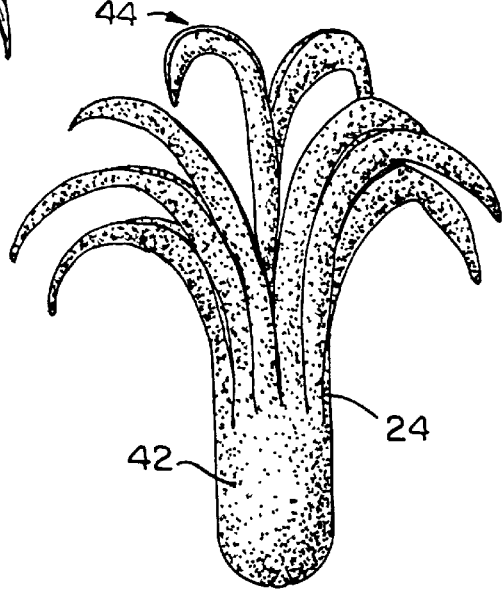
FIG. 6 is a perspective view of a first preferred food product covered entirely with the batter and breaded coating in accordance with the present invention.

The resulting product 40 of the hot dog 10 coated with batter 24 may also be breaded by thereafter immersing the battered product into a breading such as dried corn meal, bread crumbs, or the like to form a product 44 with an outer breading layer 42 shown in FIG. 6. The battered product 40 or battered and breaded product 44 is then deep fat fried for a pre-determined period of time at a pre-determined temperature.

In the presently preferred embodiment, the batter includes such mixtures as corn meal, flour, and combinations of corn meal and flour. A preferable batter is one commercially available from Newly Weds Company. If the product is also breaded, preferably a flour based breading is used. One such preferable breading is commercially available from Newly Weds Company. However, other batters and breading may be used without limiting the present invention.

The product is preferably initially deep fat fried in oil, such as, but not limited to, margarine, shortening, lard, animal fat and vegetable oils, at a temperature in the range of 385° for approximately 15–20 seconds to set the coating. If desired, the product may be fully cooked and immediately consumed. Alternatively, the product may cooked and then be refrigerated or preferably frozen and stored for consumption at a later time. A user may then refry the refrigerated or frozen or defrosted product at about 360° for one to one and one-half minutes or until the product is golden brown and has a minimum internal temperature of about 175°. Alternatively, the product may be reheated in a conventional or other oven, microwave oven or some other heating source. It will be appreciated by those of ordinary skill in the art that the temperature at which the product is deep fat fried and the time over which the deep fat frying occurs will vary depending upon the size and type of hot dog, the type of batter employed, whether or not breading is employed in addition to the batter and other factors. The exact temperature and time of deep fat frying of the product should not be considered to be a limitation on the present invention. Also whether the product is immediately consumed or if stored for later consumption should not be considered to be a limitation on the invention.

The deep fat frying process, in addition to cooking the batter and/or breading in a manner well known to those of ordinary skill in the art, causes at least some of the heated hot dog segments 20 to naturally curl, generally in the direction of the outer surface 13 of the hot dog 10 as shown in FIG. 4. The curling effect occurs because of the unequal cooking of the outer hot dog surface and the softer inner portion of the hot dog as well as the amount of adhesion between the hot dog 10 and the batter 24. It has been determined that the batter 24 adheres better to the fresh cut inner surfaces 21 of the wedge segments 20 than the outer surfaces 13 or uncut portion 23. The curling of the segments 20 during deep fat frying causes the resulting product to take on an appearance similar to that of an octopus as illustrated in FIGS. 4–6. The resulting product can be consumed by pulling the individual segments 20 from the uncut portion 22 if desired.

Figure 8:
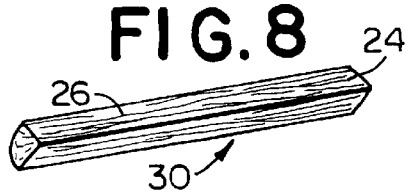
FIGS. 8–10 are perspective views of second preferred food products in accordance with the present invention.
Figure 9:
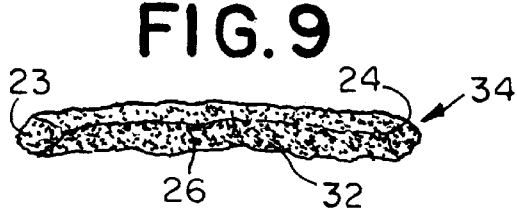
Figure 7:
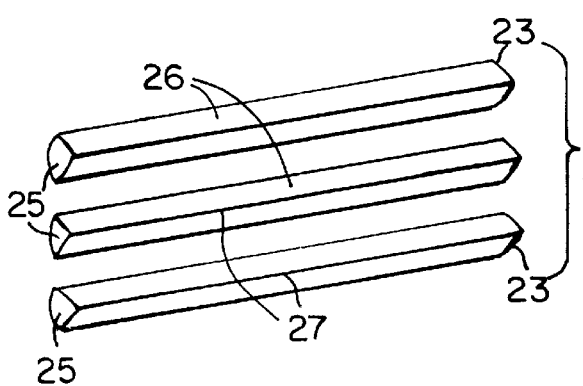
FIG. 7 is a perspective view of several hot dog wedge segments formed in accordance with a second embodiment of the present invention.
Figure 10:
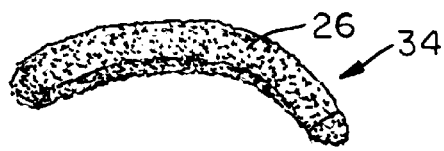

FIGS. 7 through 10 illustrate a second preferred embodiment of the present invention. The steps involved in the second embodiment are substantially similar to those described above in connection with the first embodiment. However, in the second embodiment, the hot dog 10 is cut along its entire length resulting in a plurality of separate (unconnected) elongated wedged segments 26 and no uncut portion 22. Referring to FIG. 7, the elongated wedged segments 26 each have a first and second end 23, 25 respectively and a generally long wedged shaped body 27 between the first and second ends 23,25. The ends 23, 25 may be shaped in the general triangular wedge configuration or may be tapered to have a french cut configuration (not shown). As with the first embodiment, the wedged segments 26 are individually battered or battered and breaded by dipping the individual segments 26 first into a batter to cover at least a portion of the individual segment 26 with a layer of batter 24 to form a battered product 30 as shown by hatch marks in FIG. 8. The battered segment 30 is then optionally dipped into a breading to cover the battered segment 30 with an outer coating of breading 32 and to form a battered and breaded product 34. Thereafter, the individually battered segments 30 or battered and breaded segments 34 are deep fat fried in a medium similar to that described above for a predetermined period of time at a predetermined temperature. As a result of the deep fat flying, the individual battered and breaded segments 34 may curl to a generally certain degree. Alternatively, the battered and breaded wedged segment 34 may be deep fried to create a crunchy outer coating but maintain the generally original straight shape as shown in FIG. 9. Finally, the battered and breaded wedged segment 34 may be deep fried to curl in a generally ring-like formation as shown in FIG. 10. Although FIGS. 9 and 10 show battered and breaded segments 34 that have been deep fried, battered segments 30 without breading curl to generally the same degree as those shown that have been battered and breaded. Similarly, battered segments 30 that are deep fried form an outer crunchy coating as shown in FIG. 8. The degree of curl created by deep frying the wedged segments depends on a variety of factors including type and brand of hot dog used, size of the segments, temperature of the medium in which the hot dog 10 is deep fried, amount of time the hot dog is deep fried and other factors.

Similar to the first embodiment, the fried segments 30,34 may be fully cooked and immediately consumed. Alternatively, the products 30, 34 may cooked and then be refrigerated or frozen and stored for consumption at a later time. A user may then refry the refrigerated, frozen or defrosted product at about 360° for one to one and one-half minutes or until the product 30, 34 is golden brown and has a minimum internal temperature of about 175°. Alternatively, the product 30, 34 may be reheated in a conventional or other oven; microwave oven or some other heating source.

Both of the above-described embodiments provide "fun food" which are expected to become very popular. It will be appreciated by those of ordinary skill in the art that changes may be made to the above-described embodiments without departing from the scope and spirit of the present invention. Accordingly, the present invention is not limited to the particular described embodiments.

I claim:

1. A food product comprising:
   a hot dog having a generally elongate shape with a cylindrical midsection and first and second generally curved ends; and
   a plurality of cuts extending longitudinally, through the entire width of the hot dog, from a first end to a location proximate the second end to establish a plurality of segments and an uncut end portion to which all of the segments are attached; wherein at least a portion of the segments are covered by batter.

2. A food product according to claim 1 wherein the batter and segments of the hot dog are deep fried.

3. A food product according to claim 1 wherein the hot dog is skinless.

4. A food product according to claim 1 wherein the plurality of cuts is in the range between 1 and 6 to establish a plurality of segments in the range of between 2 and 12.

5. A food product according to claim 1 wherein the portion of segments covered with batter is further covered by an outer layer of breading.

6. A food product according to claim 5 wherein the breading is selected from the group consisting of corn meal, bread crumbs, flour, and combinations thereof.

7. A food product according to claim 1 wherein the entire food product is covered with batter and deep fried.

8. A food product according to claim 1 wherein the batter comprises a mixture of corn meal and flour.

9. A method of preparing a food product comprising the steps of:
   slicing through the entire width of a hot dog, having a generally elongate shape with a generally cylindrical mid section and first and second generally curved ends, lengthwise from a first end to a location proximate the second end thereby forming a plurality of segments adjacent and connected to an uncut end portion; and
   immersing at least a portion of the segments of the hot dog into a batter so as to cover the immersed portion in a layer of batter.

10. A method of preparing a food product according to claim 9 further comprising immersing the immersed portion into breading.

11. A method of preparing a food product according to claim 9 further comprising deep frying the immersed portion.

12. A method of preparing a food product according to claim 11 wherein the batter and outer region of the hot dog are heated to a higher temperature than an inner region of the hot dog.

13. A method of preparing a food product according to claim 11 further comprising the steps of freezing and storing the food product.

14. A method of preparing a food product according to claim 13 wherein the food product is reheated.

15. A method of preparing a food product according to claim 9 wherein the entire hot dog including the plurality of segments and uncut portion are immersed in a batter to form a layer of batter, immersed in a breading to form an outer layer of breading, and deep fried.

16. A method of preparing a food product according to claim 9 wherein the slicing step is performed with a sharp thin bladed instrument.

17. A method of preparing a food product comprising the steps of:
   slicing through the entire width of a hot dog, having a generally elongate shape with a generally cylindrical mid section and first and second generally curved ends, lengthwise from the first end to the second end thereby forming a plurality of segments, each segment having first and second ends; and
   immersing at least a portion of each of the segments into a batter so as to cover the immersed portion in a layer of batter.

18. A method of preparing a food product according to claim 17 further comprising immersing the immersed portion in a breading.

19. A method of preparing a food product according to claim 18 further comprising deep frying the immersed portion.

20. A hot dog food product comprising:
   a hot dog having a generally elongate shape with a cylindrical midsection and first and second generally curved ends; and
   a plurality of cuts, each passing through the entire width of the hot dog, extending longitudinally through the hot dog from a first curved end to a location proximate the second curved end to establish a plurality of segments and an uncut end portion to which the segments are attached; wherein at least a portion of the segments are covered by batter.

21. A method of preparing a hot dog food product comprising the steps of:
  slicing through the entire width of a hot dog, that has a generally elongate shape with a generally cylindrical midsection and first and second generally curved ends, in a lengthwise direction from the first end to a location proximate the second end thereby forming a plurality of segments attached to an uncut end portion, the uncut end portion having an uncut cross-section, as taken along the width of the hot dog and extending from the second end to the plurality of segments; and
  immersing at least a portion of each of the segments into a batter so as to cover the immersed portion in a layer of batter.

22. A method of preparing a hot dog food product comprising the steps of:
  slicing through the entire width of a hot dog, that has a generally elongate shape with a generally cylindrical midsection and first and second generally curved ends, in a lengthwise direction from the first end to a location proximate the second end thereby forming a plurality of segments adjacent and connected to an uncut end portion, each slice passing through a generally central longitudinal axis; and
  immersing at least a portion of the segments of the hot dog into a batter so as to cover the immersed portion in a layer of batter.

\* \* \* \* \*